Sept. 3, 1968  SYUNSUKE NAKANO  3,399,569
TEMPERATURE AND DISCOMFORT INDEX INDICATOR
Filed April 18, 1966
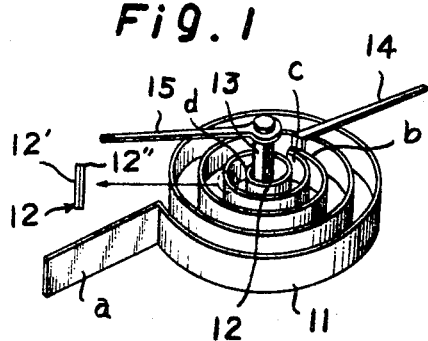
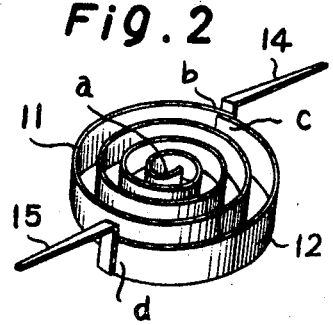
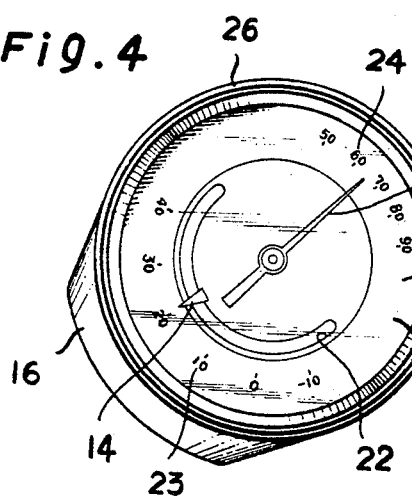
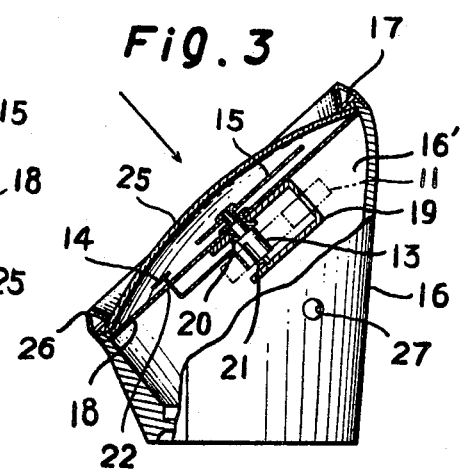
SYUNSUKE NAKANO
INVENTOR
BY Wenderoth, Lind & Ponack
ATTORNEYS United States Patent Office 3,399,569
Patented Sept. 3, 1968

3,399,569
TEMPERATURE AND DISCOMFORT
INDEX INDICATOR
Syunsuke Nakano, 236 Imaizumi-cho, Ohta-ku,
Tokyo, Japan
Filed Apr. 18, 1966, Ser. No. 543,353
Claims priority, application Japan, Sept. 20, 1965,
40/76,342
4 Claims. (Cl. 73—336)

ABSTRACT OF THE DISCLOSURE

A temperature and discomfort index device using a bimetalic coil to sense temperature and having a pointer applied to its free end. A humidity responsive element is applied to the free end of the coil and has a pointer on the other end to indicate changes in both temperature and humidity.

The present invention relates to improvements in a device for indicating the ranges of comfort and discomfort in relation to temperature and humidity, more particularly, to an indicator so devised as to enable indicating temperature and discomfort index simultaneously by means of a bimetallic temperature responsive element and a combination of a humidity sensitive element incorporated onto a metallic foil in a body with a humidity sensitive body such as paper, cellulose acetate, nitrocellulose or the like.

The object of this invention is to provide a temperature and discomfort index indicator such that the discomfort index given hitherto by calculating equations from dry- and wet-bulb temperatures may be directly read with a timepiece-like pointer, and that there is no such thing as water necessary and used for measuring wet-bulb temperatures.

The discomfort index D, the term serving as a simple expression of the composite effect of air temperature and relative humidity, will be given by the commonly known following equation $$D = (T_D + T_W) \times k \qquad (1)$$

wherein $T_D$=dry-bulb temperature; $T_W$=wet-bulb temperature; and $k$=constant.

That is to say, it is necessary to find the two indications of the dry-bulb temperature $T_D$ and the wet-bulb temperature $T_W$ in order to obtain the discomfort index D; for example, when it is calculated on the condition that humidity is 100%, $$T_D = T_W$$

that is, the indication of both will be the same. In other words, Equation 1 will be represented as $$D = 2T_D \times k \qquad (2)$$

Now, in the above, the discomfort index to be calculated is the outcome of the value of a dry-bulb temperature (air temperature) doubled and multiplied by a constant, and under such a condition as this of 100% humidity it is possible to indicate temperature and discomfort index simultaneously by means of a single bimetallic temperature responsive element alone.

Under the ordinary climatic condition, however, it is presumed that the 100% humidity is substantially inconceivable, and in practice, the condition $$T_D > T_W$$

will be common, so that, if and when $$T_D - T_W = \alpha \qquad (3)$$

the difference $\alpha$ between both will change as the humidity changes as it should do, and the said difference will be larger when the humidity is lower and will be smaller when the latter is higher.

Consequently, it is clear from Equations 2 and 3 that the foregoing Equation 1 may be replaced as $$D = (2T_D - \alpha) \times k \qquad (4)$$

The present invention is accordingly an indicator for directly indicating temperature as well as discomfort index by means of the indication of $T_D$ of said Equation 4 with bimetal, having $\alpha$ varied with a humidity sensitive element, and automatically including the displacements of both thereby dispensing with water or the like.

The object and advantages of the present invention will become apparent from the following description when taken with the appended drawings, in which:

FIG. 1 is an oblique view showing the essential component taken out of the entire composition of a preferred embodiment according to the present invention;

FIG. 2 is an oblique view showing the similar composition of a second preferred embodiment;

FIG. 3 is a partially cut-out side view of the indicator as composed as the said first embodiment of the present invention; and FIG. 4 is a frontal view as viewed from the direction of the arrow IV.

Referring to the drawings, in FIG. 1, there is provided a bimetallic temperature responsive element 11 wound up in the form of spring whose external end (a) works as a fixed end at the time of operation, the internal end (b) thereof being directly mounted with a pointer 14 which indicates temperature. There is also provided a humidity sensitive element 12 wound up similarly to, but smaller than and in the opposite direction from the said bimetallic temperature responsive element 11 which is composed, as aforementioned, of a metallic foil 12' pasted with a humidity sensitive sheet body 12" such as paper, cellulose acetate, nitrocellulose or the like. The external end (c) of the said metallic foil 12' is secured to the internal end (b) of the said bimetallic temperature responsive element 11, which end (b) being fitted to the pointer shaft 13 so as to indicate the discomfort index by a pointer 15.

Now, it may be presumed that the displacement of the bimetallic temperature responsive element 11 will represent also the displacement of $2T_D$ in aforementioned Equation 4. The humidity sensitive element 12 has the humidity sensitive material 12" on the proper side such that together with the direction of its winding it will also work in itself in accordance with the displacement of $\alpha$ of the said Equation 4, and the said displacement is combined with that of the said temperature responsive element 11 such that the relative displacement of the pointer shaft 13 will eventually show itself as $2T_D - \alpha$. Now if a dial as later described is provided herewith which will indicate the calibration of the discomfort index by means of Equation 4, the required discomfort index may be given. In this case, the winding directions of the bimetallic temperature responsive element 11 and the humidity sensitive element 12 may be set in either the same or reverse direction so far as the calibration is concerned.

Further, the humidity sensitive element 12 is such a thing as to work in accordance with the temperature change, and $\alpha$ is the temperature difference between dry and wet bulbs which will increase or decrease as humidity changes, so that there must be a relation between the humidity and $\alpha$ as follows, to wit:

(1) There is a proportional (or inversely proportional) relation between the temperature and $\alpha$; and (2) The above-said relation will not change according to the temperature change.

With respect to the first relation, in the case of the constant temperature, there will be no question since it exhibits a curve showing substantially a straight line, but it will vary slightly and gradually as the temperature changes, which fact signifies that there will be no relation constituted such as the second relation. Whereas, if and when the present device is limited in use within the scope of high temperature and high humidity alone in which the discomfort index is utilized in practice, the degree of variance of the aforementioned curve may be so fine as negligible, and therefore, errors may be prevented from taking place as long as the present device suits its purpose of use.

In FIG. 2, there is shown the second embodiment of the present invention modified from that of FIG. 1. Here is provided also a bimetallic temperature responsive element 11 constituting a similarly spring-like shape whose internal end (a) is fixed; a pointer 14 mounted to its external end (b) will indicate temperature as is so devised; the said external end (b) is connected securely with the one end of the humidity sensitive element 12 while the other end has a pointer 15 mounted on the other end thereof so as to indicate the discomfort index. The present example of embodiment is entirely the same, in principle, with that of FIG. 1, and the direction of winding and location of the humidity sensitive material 12" on element 12 is such that the displacement indicated by the pointer 15 will be $2T_D - \alpha$.

Further, FIG. 3 and FIG. 4 will show an example of indicator embodying the present invention. The herein indicator is the outcome obtained by adopting the essential components of the first embodiment of this invention, and by taking the similar form therewith it is possible to make the components of the second embodiment suit the purpose as well. The present indicator is so composed as to have an opening portion 17 inclined so as to make its dial easily readable from the outside and to have the main body 16 provided internally with a housing space 16 for the essential components thereof. The opening portion 17 of the said main body 16 is intended to retain a dial 18. The said dial 18 is provided on its backside incorporatedly with a retaining frame 19; the said pointer shaft 13 at the center of the dial 18 being pivot-fixed rotatably on a pivot suspension 21 with a bearing 20; the spring-like bimetallic temperature responsive element 11 whose external end (a) engaged partly with the said retaining frame 19 is led out onto the said dial 18 with the pointer 14 through a long slit 22 bored concentrically and opening in a part of the dial; the internal end (d) of the similarly spring-like humidity sensitive element 12 whose external end (c) is coupled with the said internal end (b) is mounted to the said pointer shaft 13; the said pointer shaft 13 protruding on the said dial 18 is mounted on its tip with the pointer 15 symmetrically with the aforementioned pointer 14; and it is so arranged respectively that the pointer 14 will point the temperature calibration 23 on the dial 18 and the pointer 15 will do likewise the calibration 24 of the discomfort index.

Thus, having the dial as well as the essential components installed as a device, the dial surface of the opening part 17 thereof is protectively covered with a piece of transparent glass 25 which is fixed up by a glass keeper 26, and the housing space 16' is communicated with the ambient air by way of air holes 27 penetrating the wall of the main body of the present device.

Such being the present invention as fully described in the foregoing, the discomfort index hitherto calculated and obtained by means of calculating equation at each occasion may be given directly through simple indication according to the present invention, thereby dispensing with troublesome computations. Further, modified from that which has carried out the addition of both displacements of dry-bulb temperature and wet-bulb temperature hitherto with two kinds of bimetal by means of a connecting mechanism, the present device may be of a simple composition. In addition, contrary to the fact that, since the conventional structure used to require the wet-bulb temperature invariably, water would be inevitably used and thus the conventional indicators are very inconvenient when used, the present invention is thoroughly freed from such inconvenience, so that a water tank is unnecessary; the handling is simple; the mechanical composition is also simple as well as conveniently compact inasmuch as the temperature responsive body and the humidity sensitive member are coupled through their form of spring into which they are constituted and thereby the assembly as well as adjustment of the device may be simplified as other further advantage of the present invention.

What is claimed is:

1. A temperature and discomfort index indicator comprising a spiral wound, bimetallic, temperature responsive element, having an internal and an external end, one end of which is fixed, a first pointer mounted on the free end of said temperature responsive element for indicating temperature as a quantity 2T, a spiral wound humidity sensitive element, also having an internal and an external end and comprising a metallic foil having a humidity sensitive material on one face thereof and having one end attached directly to the free end of the temperature responsive element and expandable and contractable to represent the difference between dry bulb and wet bulb temperature as the quantity $\alpha$, a second pointer mounted on the other end of said humidity sensitive element for indicating a discomfort index, the humidity sensitive material being on the face of the spiral wound humidity sensitive element and the direction of winding being such that the combination of movements of the two elements is according to the expression $2T - \alpha$, the displacement of said second pointer thereby being due to changes in both temperature and humidity.

2. An indicator as claimed in claim 1 in which the external end of the temperature responsive element is fixed and the humidity responsive element is attached to the internal end thereof.

3. An indicator as claimed in claim 2 in which the humidity responsive element is wound in the opposite direction from the temperature responsive element.

4. An indicator as claimed in claim 1 in which the internal end of the temperature responsive element is fixed and the humidity responsive element is fixed to the external end thereof.

References Cited

UNITED STATES PATENTS

| 2,294,540 | 9/1942 | Edwards | 73—338.3 |
| 2,874,571 | 2/1959 | Hevener | 73—344 |
| 3,053,090 | 9/1962 | Ingersoll et al. | 73—336 |
| 3,198,011 | 8/1965 | Fenner | 73—337.5 |
| 3,214,975 | 11/1965 | Solecki | 73—336 |
| 3,254,532 | 6/1966 | Smith | 73—344 |

S. CLEMENT SWISHER, *Acting Primary Examiner.*

N. B. SIEGEL, *Assistant Examiner.*